No. 660,682.  
P. W. FRYER.  
AUTOMATIC BELT SHIFTER.  
(Application filed July 5, 1900.)  
Patented Oct. 30, 1900.
(No Model.)
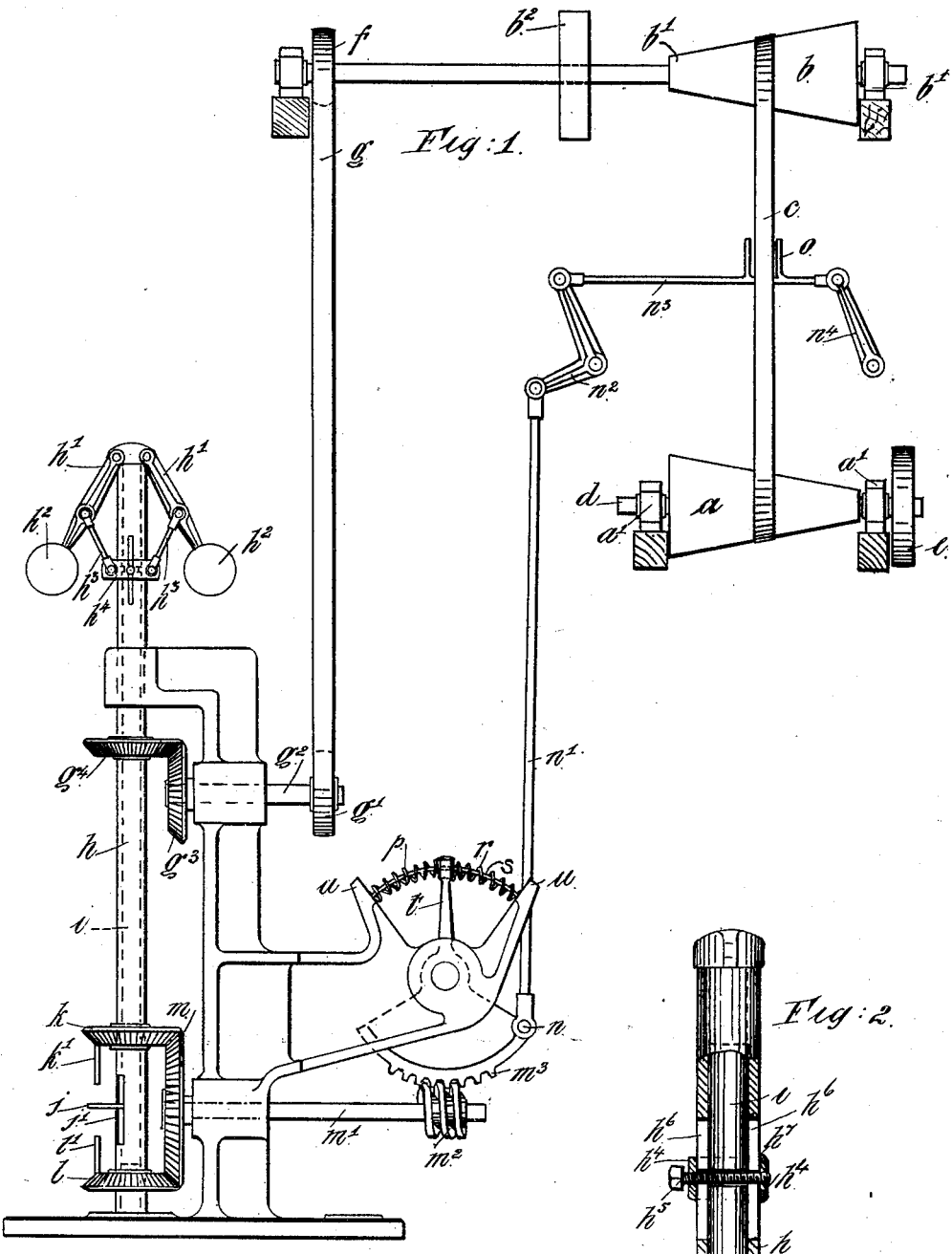
Witnesses  
Inventor  
Percy William Fryer  
by his Agent Henry H. Hayward

UNITED STATES PATENT OFFICE.

PERCY WILLIAM FRYER, OF CHRISTCHURCH, NEW ZEALAND.

AUTOMATIC BELT-SHIFTER.

SPECIFICATION forming part of Letters Patent No. 660,682, dated October 30, 1900.

Application filed July 5, 1900. Serial No. 22,604. (No model.)

*To all whom it may concern:*

Be it known that I, PERCY WILLIAM FRYER, a subject of the Queen of Great Britain, residing at 183 Hereford street, Christchurch, in the Colony of New Zealand, have invented a new and useful Automatic Belt-Shifter; and I do hereby declare the following to be a full, clear, and exact description of the same.

This invention relates more particularly to wind-power and the like motors the speed of which is liable to fluctuation; and the object is to provide simple apparatus whereby the speed of a counter-shaft driving several machines or of a single driven machine is maintained with comparatively slight variation in spite of wide variation in speed of the motor.

My invention is illustrated in the accompanying drawings, wherein—

Figure 1 is a diagrammatic front elevation, and Fig. 2 an enlarged sectional elevation of a part.

Two corresponding conical pulleys $a$ $b$ are fixed upon shafts carried in bearings $a'$ $b'$, the pulleys being connected by a driving-band $c$. The large end of one pulley is arranged opposite to the small end of the other. Conical pulley $a$ is revolved from the motor by a driving-band passing around a pulley $e$, fixed upon its axle $d$, and conical pulley $b$ has a pulley $b^2$ upon its axle, from which the machine to be driven is operated. A pulley $f$ upon the axle of the conical pulley $b$ is connected by a driving-band $g$ with a pulley $g'$ upon an axle $g^2$, upon the opposite end of which is a bevel-wheel $g^3$, gearing with a bevel-wheel $g^4$ upon the vertical tubular spindle $h$ of a "governor" of ordinary construction. Said governor consists of a pair of arms $h'$, pivoted upon the top of spindle $h$ and having balance-weights $h^2$ at their extremities, the arms being connected by links $h^3$ with a sleeve $h^4$, sliding upon spindle $h$. A vertical spindle $i$ slides telescopically within the tubular spindle $h$ and, as shown clearly in Fig. 2, is operated by sleeve $h^4$, referred to, or by a pin $h^5$, screwed into the sleeve at one end, passing through vertical slots $h^6$ upon either side of spindle $h$, passing through a hole in the inner spindle $i$, and screwing into the sleeve upon the opposite side. Spindle $i$ has a pin $j$ near its lower end projecting through a vertical slot $j'$ in tubular spindle $h$. Two bevel-wheels $k$ $l$, each carried by and free to revolve upon tubular spindle $h$, are arranged one above and the other beneath the projecting arm $j$, and both of said wheels are in gear with a bevel-wheel $m$, fixed upon a horizontal spindle $m'$, upon the opposite end of which is fixed a worm-pinion $m^2$ in gear with worm-teeth formed in the periphery of a worm-quadrant $m^3$. Worm-quadrant $m^3$ has a pin $n$ projecting from its face, connected by a connecting-rod $n'$ with one arm of a bell-crank lever $n^2$, the opposite arm of which is pivotally connected to one end of a horizontal bar $n^3$. The opposite end of bar $n^3$ is pivoted upon the end of a lever-arm $n^4$ and extends between the conical pulleys and parallel with the axles thereof. A belt-fork $o$ upon bar $n^3$ receives the driving-belt $c$, connecting the conical pulleys.

The bevel-wheels $k$ $l$ have each a projecting pin $k'$ $l'$, and it is so arranged that when the driven machine is running at its required speed the pin $j$ upon the vertical sliding spindle $i$ does not contact with either of them. An increase of speed of the motor causes the governor to raise the vertical spindle $i$ until the pin $j$ upon it contacts with the pin $k'$, projecting from the upper bevel-wheel $k$, and the worm-quadrant is operated in the direction which causes the belt-fork to shift the belt toward the small end of conical pulley $a$ and large end of conical pulley $b$ until the speed of pulley $b$ becomes normal, when the governor falls sufficiently to release pin $j$ from engagement with pin $k'$.

When decreasing speed of the motor tends to decrease the speed of the driven machine, the vertical spindle $i$ falls until the pin $j$ engages with pin $l'$ upon bevel-wheel $l$, when the worm-quadrant is operated in the contrary direction and with the opposite effect to that above described.

If the speed of the motor rises so high or falls so low that the driving-belt $c$ is moved into either of its extreme positions, further movement of the band in the same direction is prevented by the worm-pinion passing out of gear with the quadrant.

When the speed of the motor commences to rise or fall, as the case may be, when the quadrant is in either of its extreme positions, reëngagement of the worm-pinion with the quadrant is facilitated by one of the spiral springs $pr$, which are arranged upon a curved guide $s$, one upon each side of the forked end of a lever-arm $t$, projecting from the quadrant $m^3$. The curved guide passes between the forked end of lever $t$ and is carried in bracket $u$, and one of said springs is compressed between the bracket $u$ and the end of lever $t$ by movement of the quadrant in either direction.

What I claim as my invention, and desire to secure by Letters Patent, is—

1. In an apparatus for the purpose described the combination of a motor-driven conical pulley, a similar conical pulley having its small diameter opposite to the large diameter of the first pulley, a driving-belt connecting the two pulleys a governor driven from a pulley upon the axle of the second conical pulley, a vertically-sliding spindle operable by said governor a tubular spindle surrounding said vertical spindle, two bevel-wheels mounted loosely thereon, pins projecting from each, a pin projecting from said vertical spindle arranged to engage when said governor is driven above or below prearranged speeds with one or the other of the two pins on the bevel-wheels a horizontal axle, a bevel-wheel upon one end and a worm upon the other end of said axle said bevel-wheel being in mesh with each of the bevel-wheels before mentioned a quadrant of a worm-wheel engaged by the worm a bar parallel to the axes of the conical pulleys a belt-fork upon the bar for guiding the driving-belt, means for moving said bar from said quadrant as set forth.

2. In an apparatus for the purpose described the combination of a motor-driven conical pulley, a similar conical pulley having its small diameter opposite to the large diameter of the first pulley, a driving-belt connecting the two pulleys a governor driven from a pulley upon the axle of the second conical pulley, a vertically-sliding spindle operable by said governor a tubular spindle surrounding said vertical spindle two bevel-wheels mounted loosely thereon, pins projecting from each, a pin projecting from said vertical spindle arranged to engage when said governor is driven above or below prearranged speeds with one or the other of the two pins on the bevel-wheels a horizontal axle, a bevel-wheel upon one end and a worm upon the other end of said axle said bevel-wheel being in mesh with each of the bevel-wheels before mentioned a quadrant of a worm-wheel engaged by the worm a bar parallel to the axes of the conical pulleys a belt-fork upon the bar for guiding the driving-belt means for moving said bar from said quadrant a lever upon said quadrant springs actuating said lever to facilitate the reëngagement of the teeth of the worm-pinion with the teeth of the worm-quadrant as set forth.

In testimony whereof I have signed this specification in the presence of two subscribing witnesses.

PERCY WILLIAM FRYER.

Witnesses:
ERNEST J. ANSTISS,
HENRIE H. RAYWARD.